United States Patent [19]

Brambach

[11] Patent Number: 4,889,763

[45] Date of Patent: Dec. 26, 1989

[54] SANDWICH MATERIAL AND THE USE THEREOF

[75] Inventor: Johan A. Brambach, Leiden, Netherlands

[73] Assignee: Schreiner Luchtvaartgroep B.V., Leiden, Netherlands

[21] Appl. No.: 260,019

[22] Filed: Oct. 20, 1988

Related U.S. Application Data

[63] Continuation-in-part of Ser. No. 20,703, Mar. 2, 1987, Pat. No. 4,826,723, and a continuation-in-part of Ser. No. 110,793, Oct. 21, 1987.

[30] Foreign Application Priority Data

Oct. 21, 1987 [EP] European Pat. Off. ........ 87202024.3
Dec. 28, 1987 [NL] Netherlands .......................... 8703138

[51] Int. Cl.$^4$ ................................................ B32B 3/26
[52] U.S. Cl. ..................................... 428/246; 428/253; 428/286; 428/304.4; 428/316.6; 428/419; 428/473.5
[58] Field of Search ............... 428/304.4, 316.6, 473.5, 428/419, 246, 253, 286

[56] References Cited

U.S. PATENT DOCUMENTS 3,841,958  10/1974  Delorme .......................... 428/316.6
4,188,428   2/1980  Wolf ..................................... 428/71

FOREIGN PATENT DOCUMENTS 1184106   3/1985  Canada ............................ 428/319.7
0264495   4/1988  European Pat. Off. .
2906259   8/1980  Fed. Rep. of Germany ... 428/318.6
3419142  11/1985  Fed. Rep. of Germany .
1362035   4/1964  France ............................. 428/316.6
2192905   2/1974  France .
2198835   4/1974  France .
 936232   9/1963  United Kingdom ............. 428/316.6
2147850   5/1985  United Kingdom .

Primary Examiner—William J. Van Balen
Attorney, Agent, or Firm—Burns, Doane, Swecker & Mathis

[57] ABSTRACT

Sandwich material comprising at least one layer of a thermoplastic polyetherimide or polyether sulfone foam and a fibre-reinforced layer consisting of a fibrous mat impregnated with thermoplastic polyetherimide or polyether sulfone, applied to at least one surface of said foam.

10 Claims, No Drawings

SANDWICH MATERIAL AND THE USE THEREOF

This application is a continuation-in-part of Ser. Nos. 020,703 (U.S. Pat. No. 4,826,723) and 110,793, filed on Mar. 2, 1987 and Oct. 21, 1987, respectively.

This invention relates to sandwich materials suitable for use in the aircraft and spacecraft industry, the automobile industry and the ship building industry, among other applications, which sandwich material has a greatly improved firesafety.

Aircraft designers aim to use sheet materials of minimum weight in combination with maximum strength and rigidity. A further important condition is that the materials can be effectively moulded and interconnected. An additional requirement increasingly imposed upon this kind of materials, in particular in the case of interior parts, is that they have a sufficient degree of fire-retarding properties.

The combination of strength, stiffness and light weight can be found in sandwich materials made of a light-weight core, such as a honeycomb or a foam with two reinforcing layers applied to its surface. These reinforcing layers often consist of fibre-reinforced synthetic resins. In known sandwich materials, in the main irreversibly setting plastics are used, such as polyurethane foams, which generally are rather difficult to process and, after being moulded, cannot be shaped further.

It has also already been proposed to make set shaped articles with a sandwich structure by heating and moulding a composite material comprising a core of a solid material with cavities therein, and covering layers reinforced with a fibrous mat. Canadian Pat. No. 1,184,106 describes such a material consisting of a polymethacrylimide foam reinforced with polyester or glass fibre mats impregnated with an epoxy resin in the B stage, which means that this material can still be shaped with heating, whereafter the material becomes set. Further moulding is then impossible.

Such materials do not, however, possess the desired fire retarding properties. Good fire retarding properties can be obtained with solid fibre-reinforced sheets on the basis of irreversibly setting synthetic resins, such as phenol resin. These materials, however, do not have the desired light weight and possibilities of being re-shaped more than once.

For materials used in aircraft construction, and in particular for interior parts of aircraft, the degree of fire resistance is determined by means of the "Heat radiation resistance and heat release test" according to FAR 25.853 a-1+ Appendix F Part IV. A result of less than 100 kW/m$^2$ (HRR-max) in this test is at present regarded as representing a good fire resistance.

Another important feature for firesafety is that the material is self-extinguishing, that is to say that it is not itself capable of maintaining the fire, without an external source of fire, that it does not produce toxic gases upon combustion, and that it does not drip.

European patent application 264,495, which is not a prior publication, describes a thermoplastic sandwich material comprising a thermoplastic foam, according to the example a polymethacrylamide foam, provided on one or both surfaces with a fibrous mat impregnated with a thermoplastic synthetic resin. That sandwich material has a number of clear advantages over prior systems. The firesafety of the products described in the example of that application is clearly superior to that of the known products. The results of the material in the test described above range from 80 to 100 kW/m$^2$.

It is an object of the present invention to provide a sandwich material which has a sufficient mechanical strength and sufficient thermal dimensional stability, can be re-shaped more than once, and satisfies very high requirements of firesafety.

The present invention is based on the surprising insight that a sandwich material comprising, on the one hand, a polyetherimide or polyether sulfone foam, and on the other hand a fibrous mat impregnated with polyetherimide or polyether sulfone has an extremely good fire resistance.

The sandwich material accoridng to the invention is characterized in that it comprises at least·one layer of said thermoplastic foam and a fibre-reinforced layer consisting of a fibrous mat impregnated with thermoplastic polyetherimide or polyether sulfone, applied to at least one surface of said foam.

In a preferred embodiment of the invention, the sandwich material consists of a single-ply foam layer provided on opposite sides with an impregnated fibre mat.

In another preferred embodiment of the sandwich material or the laminate according to the present invention, the core layer itself is built up of at least two layers of foam bonded together for example with a possibly fibre-reinforced synthetic material, by glueing or by welding, in particular by means of fibre-reinforced polyetherimide or polyether sulfone. This composite foam layer is in turn provided on one or both sides with a fibre-reinforced layer.

The fibre-reinforced layer is preferably a fibrous mat, a fibrous web or a woven web of an aromatic polyamide, glass fibres or carbon fibres, which are again impregnated with a polyetherimide or a polyether sulfone. In certain cases it may be advantageous to have the fibres unidirectionally oriented in the fibre-reinforced layer. In case the core layer is built up from more than one foam layer with a possibly fibre-reinforced layer between them, it is also possible that the synthetic resin of said fibre-reinforced layer is a different layer of synthetic material, such as polycarbonate. It is preferable, however, both from the point of view of fire behaviour, and from the point of view of manufacture of the laminate and its mechanical properties to use a polyetherimide plastic in that layer, too. It is also possible to form the foam in situ between two layers.

A preferred material for the fibres is glass, as this product offers the most advantages from the point of view of firesafety. However, it is possible to use combinations of fibres, or to use different types of fibres in one laminate in the different fibre-reinforced layers.

As a synthetic material for the foam material, polyetherimide or polyether sulfone is used. Of these, polyetherimide is preferred in connection with the fire-proofing properties to be obtained therewith.

If desired, however, it is also possible to use PEEK as the material for the foam layer. This also applies to the synthetic material to be used as impregnation for the fibres.

The sandwich material according to the invention can in particular be used extremely well in the aircraft, spacecraft, automobile and/or ship building industries. The material according to the invention can be used for parts of aircraft, such as interior parts, containers, streamline parts, parts of chairs and the like.

The material has considerable strength, rigidity and light weight, so that it is possible for the construction to be kept extremely light.

The sandwich material according to the invention can be used for the manufacture of articles having complex shapes. For this purpose, for example, two half laminates can be used, each consisting of a layer of the foam and a fibre-reinforced layer. These two half laminates may be introduced into the same mould, whereafter the mouldings are bonded together via the surface not provided with a fibre-reinforced layer. If desired, it is even possible to interpose a fibre-reinforced layer between them.

The outer surface of the material, i.e., the fibre-reinforced layer, may be provided with supplementary layers, such as impregnated woven fabrics or non-wovens consisting, for example, of carbon fibres, aramide fibres or glass fibres, or impregnated wovens or non-wovens consisting of combinations of two or more of such fibres. This has the advantage that certain local reinforcements or adaptations can be made to the sandwich material without it being necessary to provide separate mechanical reinforcing parts.

The sandwich material according to this invention can be made in the manner as described, for example, in the above non-prepublished European patent application. For this purpose, a foam may be used, which may have been subjected to a surface treatment, such as the provision of shallow grooves to improve bonding, to which foam the fibre-reinforced layer is applied by means of an increase in pressure and temperature. If desired, one or both surfaces of the products to be bonded together may be softened with a solvent for it, such as dichloromethane. This may be combined with the application of a thin layer of a solution of the synthetic material (PES, PEI or PEEK) in a solvent, or the treatment can be confined to just applying such a solution which improves bonding. It is also possible, by a suitable choice of pressure and temperature, to omit applying such a solution, or to soften one or both layers. If desired, it is also possible to apply a film layer between the foam and the top layer, which film layer is not fibre-reinforced and functions as a bonding layer.

The foil functioning as a bonding layer can be selected from thermoplastic films capable of bonding to materials of the core and the top layer. A large number of materials are suitable for use, such as polyamide, PEEK, polyether sulfone (PES) and polyetherimide (PEI). From the viewpoint of fire behaviour, it is preferable to choose PEI, PEEK or PES, in particular PEI.

Starting from the application of a foil as a bond improver, for example, between the foam core and the top layer, various procedures for the bonding of the layers are possible.

A first method consists in superimposing the layers to be bonded together, and bonding these together with a suitable choice of temperature, time, pressure and, if desired, softening agent.

In a second method, the bonding film is first applied to the top layer. This can be done in various ways, for example, by heating under pressure, in the presence or absence of softening agent. As no foam material is used in this procedure, the use of pressure to ensure bonding between top layer and bonding film is very suitable. The modified top layer thus produced is subsequently applied to the foam core. This can be effected by heating under pressure, but it is preferable to apply a softening agent to the modified top layer, whereafter the softened side is applied to the foam core with heating. In this way, good bonding is obtained without it being necessary to apply much pressure. This is of course an advantage in methods employing foam, as it reduces the risk of unduly compressing the foam.

An alternative way of making the material according to the invention comprises forming foam in situ on the fibre-reinforced polyetherimide. This means that the starting product is not a ready sheet of foam material, but that a layer of liquid foam or a latently expandable material is applied to the fibre-reinforced layer. The sandwich material is then formed under accurately controlled conditions.

The materials according to the invention possess a unique combination of properties. The material is light in weight, combined with good mechanical properties, which render it extremely suitable for use in, for example, aircraft interiors. Moreover, and very importantly, the material is so fire resistant that it easily scores a value of less than 50 kW/m$^2$ in the HRR-FAR test as defined above. In particular for thermoplastic materials, this combination of properties is highly unusual.

The invention is illustrated in and by the following examples, without being limited thereto.

EXAMPLE 1

A sandwich material was composed, starting from a 5 mm thick sheet of polyetherimide foam (Ultem, GEP) and two layers of glass fibre reinforced polyetherimide (Ultem, HEP).

The layers of glass fibre reinforced polyetherimide were painted with dichloromethane, which softened the matrix material.

The fibre-reinforced material was applied to the foam sheet with the softened surfaces facing the sheet. This composite was introduced into a heated press, in which the sandwich material was made at 4 bar and 185° C.

A test piece of this material, having a thickness of 4.5 mm and a weight of 0.75 kg/m$^2$, was subjected to the Heat radiation resistance and heat release test according to FAR. The result was a value of 15 kW/m$^2$ (HRR-max) and 9 kW.min/m$^2$ (MR-2 min). By comparison, a comparable sandwich material on the basis of polymethacrylamide has a value of 100 kW/m$^2$ (HRR-max) in this test.

EXAMPLE 2

A sandwich material was composed starting from a sheet of polyetherimide foam (Ultem, GEP) as the core material. For this purpose, first two top layers were made, in each case by pressing two layers of polyetherimide-impregnated glass fibre mat (SE-107, ten Kate) together under pressure (60 bar) and with heating for 300 seconds. The polyetherimide content of the polyetherimide-impregnated glass fibre mat was 43% by weight.

To one side of these two top layers, a bonding foil was applied by heating under pressure. This bonding foil was a 75 μm thick foil of polyetherimide. By means of dichloromethane, the side of the top layers coated with bonding foil was softened, and these top layers were applied to the foam sheet, with the softened side facing it, at a temperature of 185° C. The resulting sandwich material had a thickness of 6 mm. The "Heat radiation and heat resistance test" according to FAR gave for HRR-max a value of 42.kW/m$^{-2}$ and for HR-2 min a value of 20 kW.min.m$^{-2}$.

EXAMPLE 3

A sandwich material was made from a polyetherimide foam sheet and a polyetherimide-impregnated glass fibre mat. One surface of the impregnated glass fibre mat was softened with dichloromethane and subsequently bonded to the foam sheet. The resulting sandwich material had a thickness of 6 mm. The "Heat radiation and heat resistance test" according to FAR gave a HRR-max value of 53 kW.m$^{-2}$ and a HR-2 min value of 28 kW.min.m$^{-2}$.

I claim:

1. Sandwich material comprising at least one layer of a thermoplastic polyetherimide or polyether sulfone foam and a fibre-reinforced layer comprising a fibrous mat impregnated with thermoplastic polyetherimide or polyether sulfone, applied to at least one surface of said foam.

2. A material as claimed in claim 1 wherein the foam is provided with an impregnated fibrous web on both sides.

3. A material as claimed in claim 1, including a core layer formed by bonding together at least two layers of said thermoplastic foam.

4. A material as claimed in claim 3, wherein said core layer comprises at least two layers of thermoplastic foam bonded together through direct contact.

5. A material as claimed in claim 3, wherein the core layer comprises at least two layers of thermoplastic foam bonded together with a fibrous mat between.

6. A material as claimed in claim 1, wherein the fibrous mat is a woven fabric, a knitted fabric, a nonwoven and/or unidirectionally oriented fibre structure.

7. A material as claimed in claim 1, wherein the fibres are aramide fibres, carbon fibres, glass fibres or a combination of two or more of these fibres.

8. A material as claimed in claim 7, wherein the fibres are glass fibres.

9. A material as claimed in claim 1, wherein the thermoplastic foam is formed in situ.

10. A material as claimed in claim 1, wherein the thermoplastic foam is polyetherimide foam.

* * * * *